US009361665B2

(12) United States Patent
Kuffner et al.

(10) Patent No.: US 9,361,665 B2
(45) Date of Patent: Jun. 7, 2016

(54) METHODS AND SYSTEMS FOR VIEWING A THREE-DIMENSIONAL (3D) VIRTUAL OBJECT

(71) Applicant: Google Inc., Mountain View, CA (US)

(72) Inventors: James Joseph Kuffner, Sunnyvale, CA (US); James Robert Bruce, Sunnyvale, CA (US); Thor Lewis, San Francisco, CA (US); Sumit Jain, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 14/091,502

(22) Filed: Nov. 27, 2013

(65) Prior Publication Data
US 2015/0145891 A1    May 28, 2015

(51) Int. Cl.
*G06T 3/60* (2006.01)
*G06T 15/20* (2011.01)

(52) U.S. Cl.
CPC ..................................... *G06T 3/60* (2013.01)

(58) Field of Classification Search
CPC   G06T 15/20; G06T 17/20; G09G 2340/0492; G09G 2340/0407
USPC ................... 345/427, 428, 649, 660
See application file for complete search history.

(56) References Cited

U.S. PATENT DOCUMENTS

| 6,064,389 | A | 5/2000 | Berry et al. | |
| 6,525,732 | B1 * | 2/2003 | Gadh et al. | 345/428 |
| 6,556,206 | B1 * | 4/2003 | Benson et al. | 345/427 |
| 8,044,953 | B2 | 10/2011 | Khan et al. | |
| 2002/0140698 | A1 * | 10/2002 | Robertson et al. | 345/427 |
| 2015/0049086 | A1 * | 2/2015 | Morato et al. | 345/427 |
| 2015/0153172 | A1 * | 6/2015 | Starns et al. | 382/106 |

OTHER PUBLICATIONS

Azam Khan, Ben Komalo, Jos Stam, George Fitzmaurice & Gord Kurtenbach, "HoverCam: Interactive 3D Navigation for Proximal Object Inspection," I3D 2005 Conference Proceedings:ACM Symposium on Interactive 3D Graphics. pp. 73-80 (2005).

* cited by examiner

*Primary Examiner* — Chante Harrison
(74) *Attorney, Agent, or Firm* — McDonnell Boehnen Hulbert & Berghoff LLP

(57) ABSTRACT

Instructions indicative of changing a view of a virtual object may be received by a device. At least a portion of the virtual object may be viewable from a viewpoint that is at a given distance from a surface of the virtual object. The device may cause a change of the view along a rotational path around the virtual object in response to the receipt of the instructions based on the given distance being greater than a threshold distance. The device may cause a change of the view along a translational path indicative of a shape of the surface of the virtual object in response to the receipt of the instructions based on the given distance being less than the threshold distance.

17 Claims, 10 Drawing Sheets

METHODS AND SYSTEMS FOR VIEWING A THREE-DIMENSIONAL (3D) VIRTUAL OBJECT

BACKGROUND

In computer graphics, three-dimensional modeling (3D) involves generation of a representation of a 3D surface of an object. The representation may be referred to as a 3D virtual object data model, and can be rendered or displayed as a two-dimensional image via 3D rendering or displayed as a three-dimensional image. 3D virtual object data models represent a 3D virtual object using a collection of points in 3D space, connected by various geometric entities such as triangles, lines, curved surfaces, etc. Various techniques exist for generating 3D virtual object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D virtual object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one example, a method is provided that comprises receiving instructions indicative of changing a view of a virtual object by a device. At least a portion of the virtual object may be viewable from a viewpoint that is at a given distance from a surface of the virtual object. The method further comprises causing a change of the view along a rotational path around the virtual object in response to the receipt of the instructions based on the given distance being greater than a threshold distance. The method further comprises causing a change of the view along a translational path indicative of a shape of the surface of the virtual object in response to the receipt of the instructions based on the given distance being less than the threshold distance.

In another example, a device is provided that comprises one or more processors and data storage configured to store instructions executable by the one or more processors. The instructions may cause the device to receive data indicative of changing a view of a virtual object. At least a portion of the virtual object may be viewable from a viewpoint that is at a given distance from a surface of the virtual object. The instructions may further cause the device to cause a change of the view along a rotational path around the virtual object in response to the receipt of the data based on the given distance being greater than a threshold distance. The instructions may further cause the device to cause a change of the view along a translational path indicative of a shape of the surface of the virtual object in response to the receipt of the data based on the given distance being less than the threshold distance.

In yet another example, a non-transitory computer readable medium is provided. The non-transitory computer readable medium may have instructions stored therein that when executed by a computing device cause the computing device to perform functions. The functions comprise receiving data indicative of changing a view of a virtual object by the computing device. At least a portion of the virtual object may be viewable from a viewpoint that is at a given distance from a surface of the virtual object. The functions further comprise causing a change of the view along a rotational path around the virtual object in response to the receipt of the data based on the given distance being greater than a threshold distance. The functions further comprise causing a change of the view along a translational path indicative of a shape of the surface of the virtual object in response to the receipt of the data based on the given distance being less than the threshold distance.

These as well as other aspects, advantages, and alternatives, will become apparent to those of ordinary skill in the art by reading the following detailed description, with reference where appropriate to the accompanying figures.

DETAILED DESCRIPTION

Figure 1:
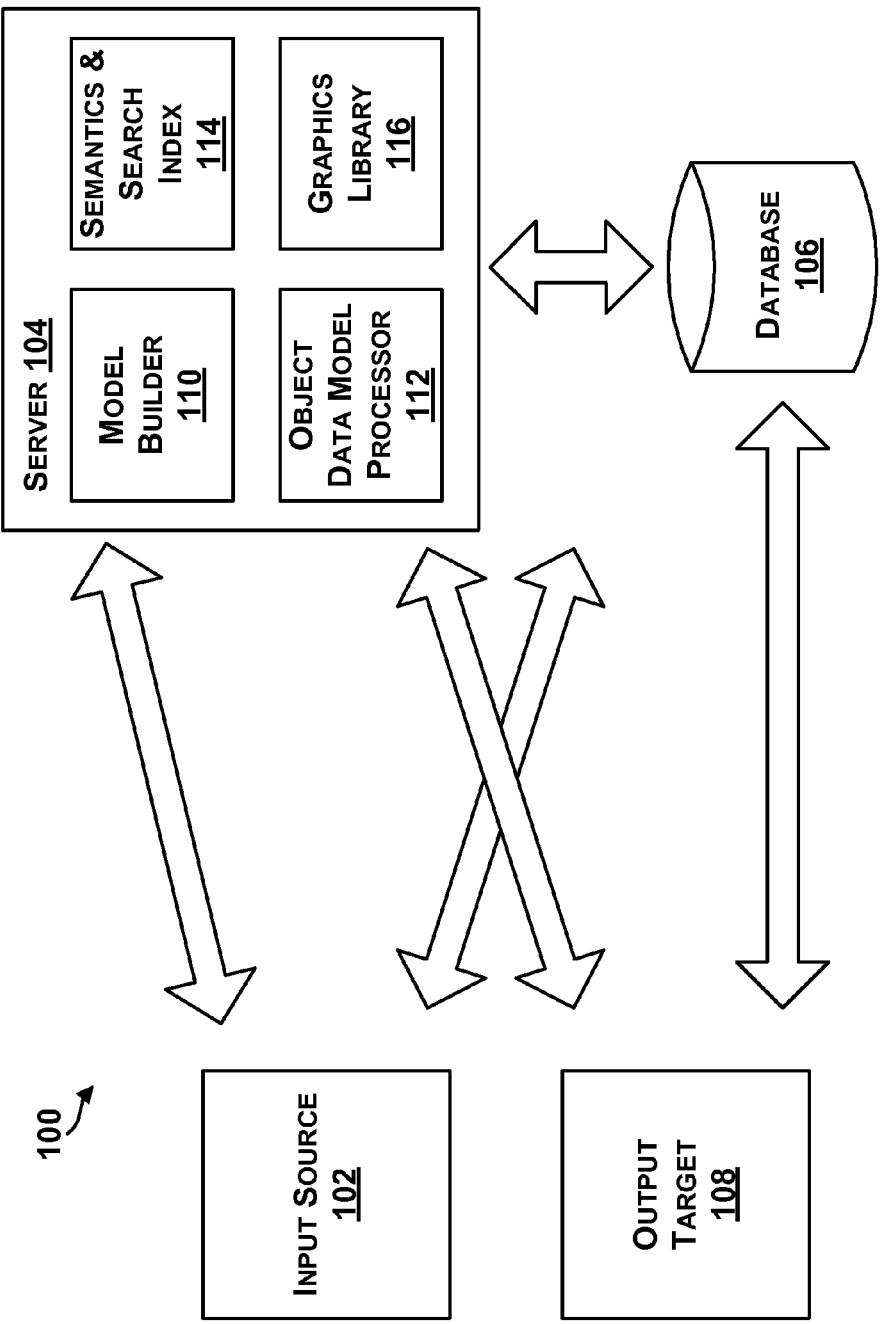
FIG. 1 illustrates an example system for object data modeling, in accordance with at least some embodiments described herein.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

In some examples, a 3D image renderer, such as an embedded 3D image viewer of a product in a webpage, may be configured to render an image of a 3D virtual object from a given viewpoint. For example, the renderer may provide the image of the virtual object from a viewpoint of a virtual camera around the object. Additionally, in some examples, the renderer may allow a user to view the virtual object from various angles and distances (e.g., zoom settings) by navigating around the virtual object, which may correspond to moving the virtual camera to various positions and various angles around the virtual object. However, in some examples, controlling the viewpoint of such virtual camera may be a complex process for a novice user. For example, the user may utilize a 2D input such as a mouse (e.g., by changing position of mouse and clicking) and/or a 1D input such as a scrollbar of the mouse to control the viewpoint of the virtual camera. In this example, the user may be utilizing three independent inputs to control a six-dimensional viewpoint (e.g., 3D position of the virtual camera and 3D orientation of the virtual camera). For example, if the 2D input is mapped to a rotational path for the virtual camera, the viewpoint of the virtual camera may become closer to the virtual object or even inside the virtual object, or a line-of-sight of the virtual camera may focus substantially away from the virtual object. Additionally, for example, if the 2D input is mapped to a linear path for the virtual camera, a zoom level of the view may continuously change due to a shape of a surface of the virtual object or the virtual object may become out of focus. Such behavior in the examples above may cause the user to become disoriented when viewing the virtual object.

Within examples herein, systems, methods and devices are provided for intuitive control of such virtual camera to view a three-dimensional (3D) virtual object. In one example, a device may be configured to determine a given path for a viewpoint around the virtual object, and constrain a view of the virtual object to be from the viewpoint along the given path in response to receipt of instructions indicative of changing the view. In some examples, the given path may be determined based on a given distance (e.g., zoom setting) between the viewpoint and a surface of the virtual object. For example, the given path may correspond to a rotational path around the virtual object when the given distance is greater than a threshold distance (e.g., low zoom setting), and the given path may correspond to a translational path indicative of a shape of a surface of the virtual object (e.g., hovering at the given distance from the surface) when the given distance is less than the threshold distance (e.g., high zoom setting). In some examples, the translational path may be indicative of a blend between the shape of the surface and the rotational path. For example, as the given distance approaches the threshold distance (e.g., when zoom setting is reduced), the given path may be configured to resemble the rotational path more than the shape of the surface.

In some examples, the given path may include a plurality of points at the given distance such that changing the view along the given path may correspond to the view having the same given distance (e.g., zoom setting) after the change. Additionally, in some examples, a direction of the view from the viewpoint may also be constrained. For example, a line-of-sight of the view from the viewpoint may be configured to be substantially perpendicular to the given path at the viewpoint after the change. Additionally, in some examples, the direction of the view may be further constrained based on one or more features in the virtual object. For example, the device may determine a relative direction (e.g., up direction) of the virtual object that corresponds to a location of the one or more features, and align the view such that the relative direction corresponds to a given direction of the view (e.g., the one or more features may remain at a given side of the view after the change).

Thus, example methods herein may include mapping received input to a given view of the virtual object while intuitively constraining the given view of the virtual object.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D virtual object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D virtual object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no UV unwrapping to generate a mesh (D) with UV unwrapping but no colors. As an example, for a single output texture pixel of an image processing may include, for a given point in UV determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may include a WebGL or OpenGL mesh compression to reduce a mesh file size, for example. The graphics library 116 may provide the 3D virtual object data model in a form for display on a browser, for example. In some examples, a 3D virtual object data model viewer may be used to display images of the 3D virtual objects data models. The 3D virtual object data model viewer may be implemented using WebGL within a web browser, or OpenGL, for example.

The database 106 may store all data sets for a 3D virtual object data model in any number of various forms from raw data captured to processed data for display.

The output target 108 may include a number of different targets, such as a webpage on the Internet, a search engine, a database, etc. The output target 108 may include a 3D virtual object data model viewer that enables product advertisements or product searches based on the 3D virtual object data model, for example.

Within examples herein, the system 100 may be used to acquire data of an object, process the data to generate a 3D virtual object data model, and render the 3D virtual object data model for display.

Figure 2:
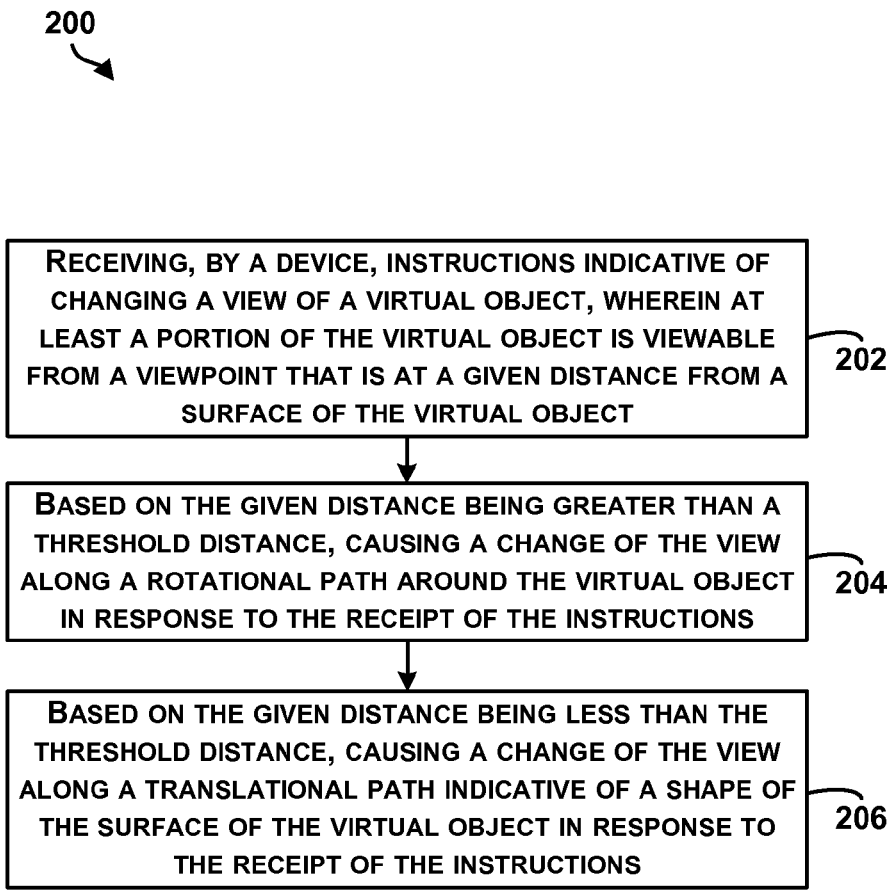
FIG. 2 is a block diagram of an example method for changing a view of a virtual object, in accordance with at least some embodiments described herein.

FIG. 2 is a block diagram of an example method 200 for changing a view of a virtual object, in accordance with at least some embodiments described herein. Method 200 shown in FIG. 2 presents an embodiment of a method that could be used with the system 100, for example. Method 200 may include one or more operations, functions, or actions as illustrated by one or more of blocks 202-206. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

At block 202, the method 200 includes receiving instructions (e.g., data) indicative of changing a view of a virtual object by a device. At least a portion of the virtual object may be viewable from a viewpoint that is at a given distance from a surface of the virtual object. For example, the device may be a computing device such as a smartphone or tablet that is configured to view the 3D virtual object. For example, the device may include an application configured to view representations of one or more products, and when a given product is selected, the device may render an image of the virtual object that represents the given product from the viewpoint that is at the given distance (e.g., zoom setting). Further, in this example, the device may receive instructions indicative of changing the view of the virtual object. For example, the device may receive input such as a touch or flick on a touchscreen that indicates viewing the virtual object (e.g., the given product) from a different angle.

At block 204, the method 200 includes causing a change in the view along a rotational path around the virtual object in response to the receipt of the instructions based on the given distance being greater than a threshold distance. Referring to the example at block 202, the path of the viewpoint may be determined based on the given distance. For example, in response to receiving the instructions, if the given distance is greater than the threshold distance (e.g., low zoom setting), the viewpoint may be changed in the rotational path around the virtual object such that the virtual object seems to be rotated to the different angle in the device's viewer. In this example, changing the view along the rotational path may be intuitive for the user because the viewpoint may not be inside the object after the change due to the given distance being greater than the threshold distance (e.g., low zoom setting). Additionally, in this example, the virtual object may remain in a line-of-sight of the viewpoint at the given distance (e.g., low zoom setting) when the viewpoint is moved along the rotational path. For example, a processor in the device may send instructions to a graphics processing unit (GPU) to cause the GPU to change the view (e.g., by displaying the changed view).

At block 206, the method 200 includes causing a change in the view along a translational path indicative of a shape of the surface of the virtual object in response to the receipt of the instructions based on the given distance being less than the threshold distance. For example, if the device determines that the given distance is less than the threshold distance (e.g., high zoom setting), moving the viewpoint along the rotational path may cause an observer to get disoriented due to the line-of-sight at the viewpoint relative to the virtual object substantially changing. Thus, for example, the device may cause the viewpoint to move along the translational path to simulate hovering over the surface of the virtual object to maintain the line-of-sight directed at the virtual object, the given distance from the surface, and to simulate the shape of the virtual object. For example, a processor in the device may send instructions to a graphics processing unit (GPU) to cause the GPU to change the view (e.g., by displaying the changed view).

In some examples, the translational path may correspond to a blend of the rotational path and the surface of the object. For example, if the user zooms out to a second distance other than the given distance but still less than the threshold distance, the translational path may resemble the rotational path more than the shape of the surface of the object.

In some examples, the method 200 may further comprise determining a relative direction of the virtual object that corresponds to a location of one or more features in the virtual object. In these examples, changing the view may further be based on an alignment between the view and the relative direction of the virtual object. For example, the virtual object may represent a bottle and the one or more features may correspond to a lid of the bottle. In this example, the lid may be indicative of the relative direction (e.g., "up" direction) and the device may be configured to change the view such that the lid remains in an upper portion of the view (e.g., alignment).

Figure 3A:
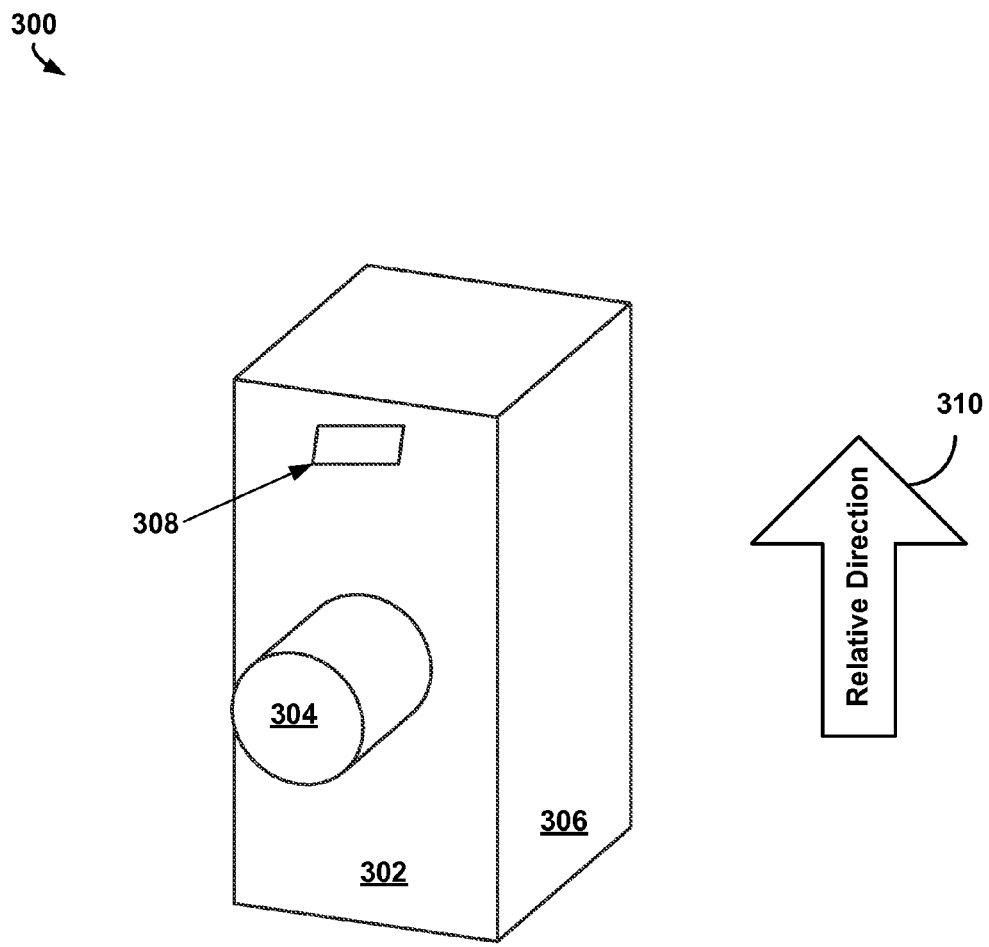
FIG. 3A illustrates a 3D perspective view of an example virtual object, in accordance with at least some embodiments described herein.

FIG. 3A illustrates a 3D perspective view of an example virtual object 300, in accordance with at least some embodiments described herein. The virtual object 300 may be based on a 3D virtual object data model such as those provided by the system 100, for example. Additionally, for example, the view of the virtual object 300 may be determined by a method such as the method 200. For example, the view of the virtual object 300 as illustrated in FIG. 3A may be from a viewpoint outside the virtual object 300 that is at a given distance (e.g., zoom setting) from a first surface 302, a second surface 304, and/or a third surface 306 of the virtual object 300. In some examples, FIG. 3A may represent the view of the virtual object 300 rendered by an image viewer such as an embedded viewer in a webpage or a display of a handheld device as described in the system 100.

Although illustrated in FIG. 3A that surfaces of the virtual object 300 (e.g., 302, 304 and 306) are generally planar, in some examples, the virtual object 300 may include complex surface features such as curves, holes, self-intersections, etc. Additionally, in some examples, the virtual object 300 may have curved edges or any other feature such that the virtual object 300 resembles a physical object. In some examples, the virtual object 300 may include surfaces that have various colors, textures, etc.

In some examples, the virtual object 300 may include one or more features such as feature 308. For example, the feature 308 may comprise a transcription or an indentation such as a product label or mark. Although not illustrated in FIG. 3A, in some examples, the feature 308 may comprise a volumetric shape such as a button, a cylinder, a prism, etc.

In some examples, a relative direction 310 of the virtual object 300 may be determined based on the feature 308. For example, a method such as the method 200 may constrain a view of the virtual object 300 in response to receiving instructions to change the view such that the relative direction 310 is aligned and the feature 308 appears to be in a same direction in the changed view (e.g., "up" direction). For example, a line-of-sight of the view may be constrained to align with the relative direction 310 (e.g., "up" direction) after the change.

Figure 3B:
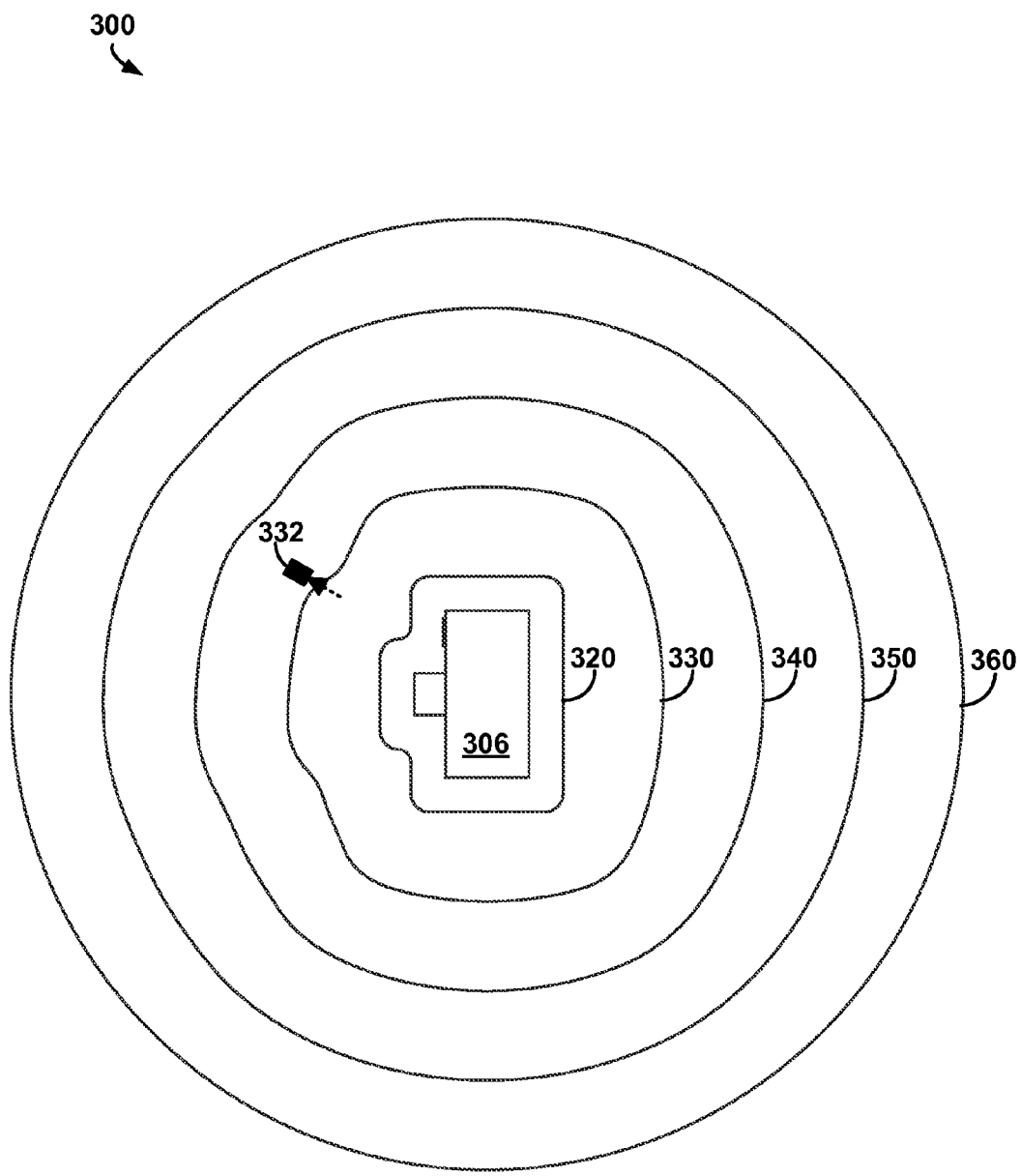
FIGS. 3B-3C illustrate example paths for changing the view of the virtual object illustrated in FIG. 3A, in accordance with at least some embodiments described herein.
Figure 3C:
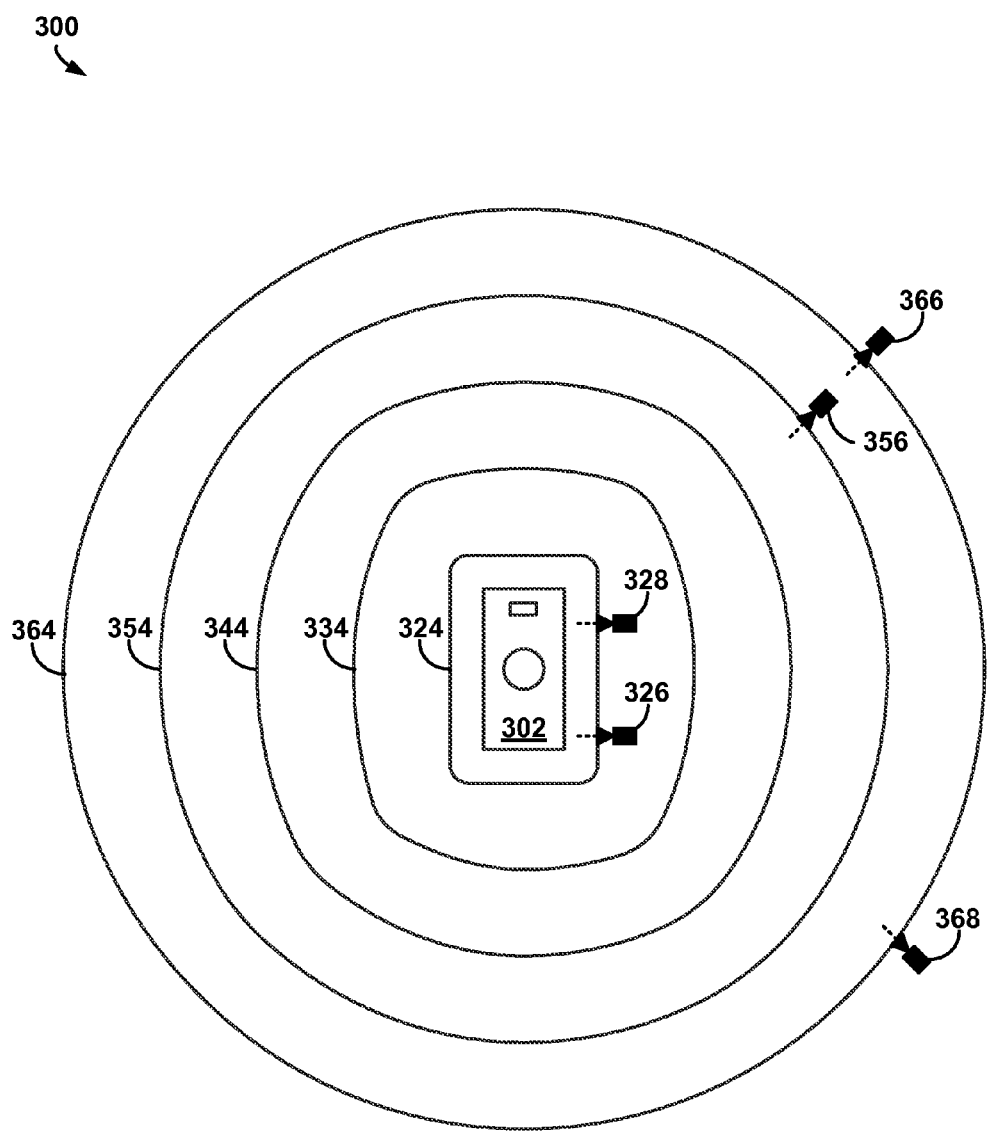

FIGS. 3B-3C illustrate example paths for changing the view of the virtual object 300 illustrated in FIG. 3A, in accordance with at least some embodiments described herein. FIG. 3B illustrates the paths 320, 330, 340, 350 and 360 around the virtual object 300 when the third surface 306 of the virtual object 300 is facing out of the page. As illustrated in FIG. 3B, the paths 320-360 correspond to paths described in the method 200. For example, the translational path 320 is indicative of a shape of the surfaces 302-306 of the virtual object 300 based on a given viewpoint on the path 320 being at the given distance that is less than the threshold distance. Additionally, for example, if the viewpoint was at the given distance corresponding to the path 360 (e.g., greater than the threshold distance), a rotational path 360 may be provided when changing the view of the virtual object 300. For example, the threshold distance may be greater than a first distance associated with the path 350 and less than a second distance associated with the path 360. Thus, for example, the paths 320-350 correspond to the translational path indicative of the shape of the surfaces 302-306, and the path 360 corresponds to the rotational path around the virtual object 300 (e.g., circular path, orbital path, etc.). In some examples, the translational path may be indicative of a blend between the shape of the surfaces 302-306 and the rotational path illustrated by the path 360. For example, a viewpoint 332 may be changed along the path 330 along the translational path that corresponds to a blend of the surfaces 302-306 and the rotational path. In some examples, the blend may be based on the given distance. For example, the path 330 resembles the surfaces 302-306 more than the path 350 due to the path 350 having the given distance that is further from the surfaces 302-306 than the path 330.

In some examples, the viewpoint 332 may simulate viewing the virtual object 300 from the viewpoint of a virtual camera at the viewpoint 332. For example, the dashed lines illustrated in FIG. 3B may correspond to a line-of-sight of the virtual camera when viewing the virtual object 300. For example, the view of the virtual object 300 as illustrated in the FIG. 3A may correspond to the view from the virtual camera when the virtual camera is at the viewpoint 332.

FIG. 3C illustrates example paths 324, 334, 354, and 364 around the virtual object 300 when the first surface 302 of the virtual object 300 is facing outside the page. Example scenarios for changing the view of the virtual object 300 are illustrated in FIG. 3C. In one example scenario, the view of the virtual object 300 may initially be at viewpoint 326. Further, in this example, instructions may be received to change the view based on input such as input from a mouse. In response to receiving the instructions, an example device may determine changing the view along the path 324 from the viewpoint 326 to viewpoint 328. In this example, the path 324 may be a translational path that is substantially linear to correspond to the third surface 306 (not shown in FIG. 3C) based on the given distance of the viewpoint 326 being less than the threshold distance (e.g., high zoom setting).

In another example scenario, the view of the virtual object 300 may initially be at viewpoint 366. Thus, for example, in response to receiving instructions indicative of changing the view, the example device may determine changing the view along the path 364 that is a rotational path from the viewpoint 366 to viewpoint 368 based on the given distance between the virtual object 300 and the viewpoint 366 being greater than the threshold distance. In some examples, the device may further constrain the view to be substantially perpendicular to a gradient of the path 364. For example, the line-of-sight (e.g., dashed lines) of the view at the viewpoint 366 may be substantially perpendicular to the gradient of the path 364, and the line-of-sight of the view at the viewpoint 368 (e.g., after changing the view) may be configured also to be substantially perpendicular to the gradient of the path 364 as illustrated in FIG. 3C.

In some examples, the example device may receive instructions to change a zoom level (e.g., the given distance between viewpoint and surface). In some examples, the example device may constrain the view after the change such that the view is changed along the line-of-sight that is perpendicular to a corresponding path at an initial viewpoint. For example, the view of the virtual object 300 may initially be at viewpoint 356. Thus, for example, in response to receiving the instructions indicative of changing the zoom level (e.g., zoom out), the example device may change the view along a given path that is substantially perpendicular to the gradient of the path 354 at the viewpoint 356 to the viewpoint 366.

Figure 4:
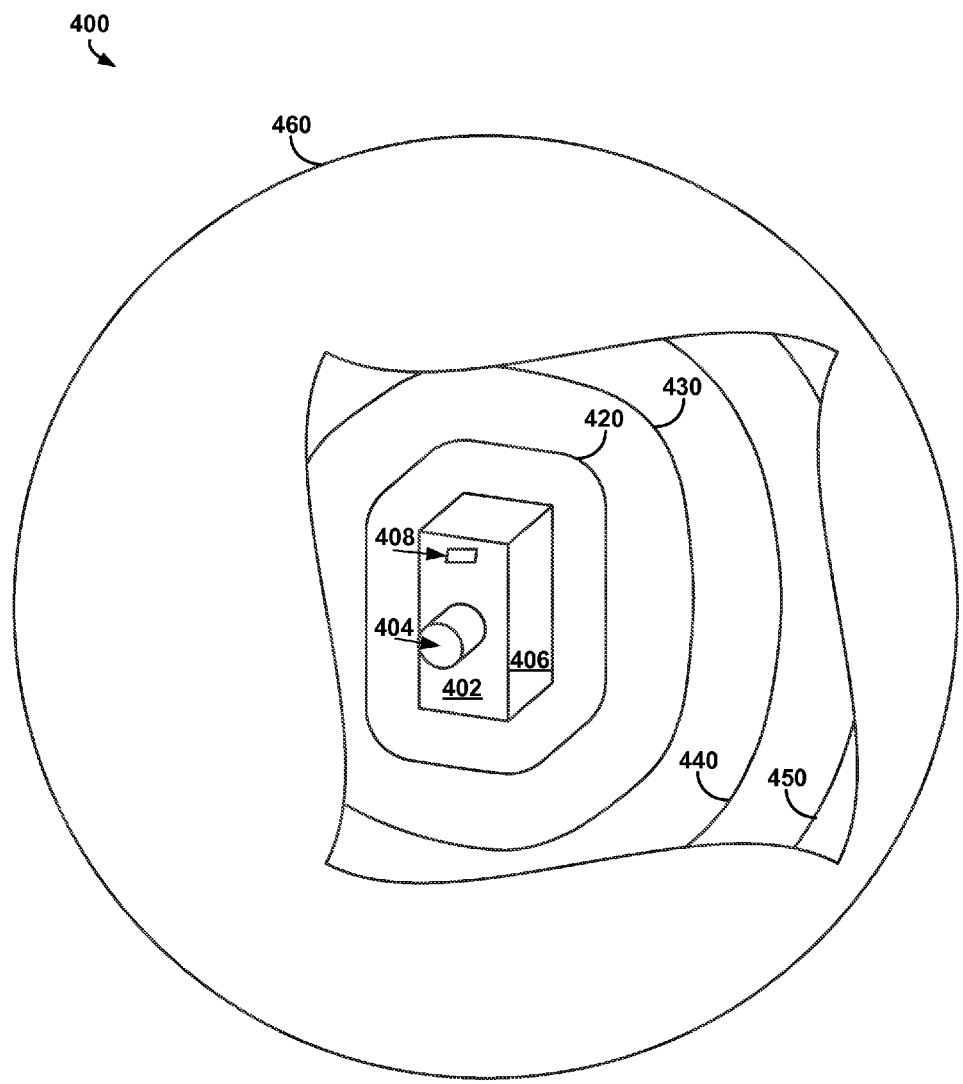
FIG. 4 illustrates a plurality of isosurfaces configured to encompass a virtual object, in accordance with at least some embodiments described herein.

FIG. 4 illustrates a plurality of isosurfaces 420-460 configured to encompass a virtual object 400, in accordance with at least some embodiments described herein. The virtual object 400 may be similar to the virtual object 300 of FIGS. 3A-3C. For example, surfaces 402, 404, and 406 may correspond, respectively, to surfaces 302, 304, and 306 of the virtual object 300. Additionally, for example, the virtual object 400 includes feature 408 similar to the feature 308 of the virtual object 300. It is noted that a portion of the isosurfaces 420-460 is omitted in FIG. 4 to illustrate the virtual object 400 encompassed in the isosurfaces 420-460. FIG. 4 illustrates an example implementation for determining the example paths in FIGS. 3B-3C. For example, the paths 320, 330, 340, 350, and 360 in FIG. 3B may be included, respectively, in the isosurfaces 420-460. Similarly, for example, the paths 324, 334, 344, 354, and 360 in FIG. 3C may also be included, respectively, in the isosurfaces 420-460.

In some examples, constraining a view of the virtual object 400 as described in the method 200 and in the description of FIGS. 3B-3C may correspond to determining a given path along a given isosurface of the isosurfaces 420-460. For example, the isosurface 420 may be determined to correspond to a shape of the surfaces 402, 404, and 406 (e.g., including translational paths) based on a given distance of a corresponding viewpoint being less than a threshold distance (e.g., high zoom setting). Thus, for example, the paths 320 and 324 in FIGS. 3B-3C may be included along the isosurface 420 encompassing the virtual object 400 that includes level-sets (e.g., plurality of points) at the given distance of the viewpoint 326. Referring back to FIG. 3C, for example, in response to receiving instructions to change the view, an example device may be configured to change the view from viewpoint 326 to viewpoint 328 along the path 324 included in the isosurface 420. In this example, the viewpoints 326 and 328 may correspond to two of the plurality of points on the isosurface 420, and the path 324 may correspond to a path along the isosurface 420.

Additionally or alternatively, for example, the isosurface 460 may be determined to correspond to a spherical shape (e.g., including rotational paths) based on the given distance being greater than the threshold distance (e.g., low zoom setting). For example, the paths 360 and 364 in FIGS. 3B-3C may be included along the isosurface 460 encompassing the virtual object 400 that includes level-sets (e.g., plurality of points) at the given distance of the viewpoint 366. Referring back to FIG. 3C, for example, in response to receiving instructions to change the view, the example device may be configured to change the view from viewpoint 366 to viewpoint 368 along the path 366 included in the isosurface 460. In this example, the viewpoints 366 and 368 may correspond to two of the plurality of points on the isosurface 460, and the path 364 may correspond to a path along the isosurface 460.

Thus, for example, the paths 320, 330, 340, 350, and 360 in FIG. 3B may resemble a cross-section view of the isosurfaces 420-460 when the surface 406 is facing out of the page. Similarly, for example, the paths 324, 334, 344, 354, and 364 in FIG. 3C may resemble a cross-section view of the isosurfaces 420-460 when the surface 402 is facing out of the page.

In some examples, the plurality of isosurfaces 420-460 may be determined as a pre-processing step by a 3D object renderer. For example, when the virtual object 400 is selected for viewing, the example device may compute the plurality of isosurfaces 420-460 that include the paths 320, 324, 330, 334, 340, 344, 350, 354, 360, and/or 364 illustrated in FIGS. 3B-3C. For example, the isosurface 420 that includes level-sets at a minimum distance from the virtual object 400 may correspond to a maximum zoom level and the isosurface 460 that includes level-sets with a maximum distance from the virtual object 300 may correspond to a minimum zoom level. Thus, for example, in response to receiving instructions to change the view, the example device may determine a given path for changing the view along a given isosurface of the isosurfaces 420-460 based on a distance between surfaces 402-406 and the given isosurface.

Figure 5:
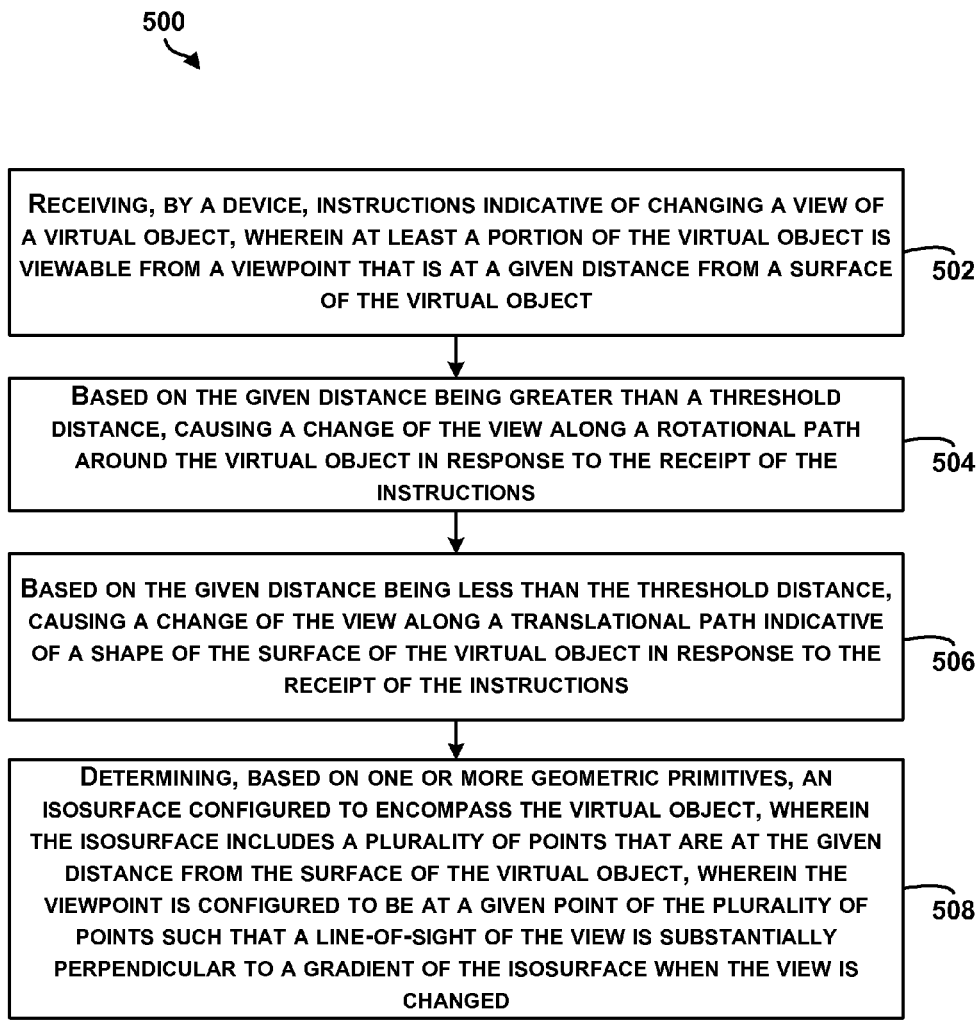
FIG. 5 is a block diagram of an example method for changing a view of a virtual object based on determining an isosurface configured to encompass the virtual object, in accordance with at least some embodiments described herein.

FIG. 5 is a block diagram of an example method 500 for changing a view of a virtual object based on determining an isosurface configured to encompass the virtual object, in accordance with at least some embodiments described herein. Method 500 shown in FIG. 5 presents an embodiment of a method that could be used with the system 100, the virtual object 300 and/or the virtual object 400, for example. Method 500 may include one or more operations, functions, or actions as illustrated by one or more of 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the method 500 includes receiving instructions indicative of changing a view of a virtual object by a device. At least a portion of the virtual object may be viewable from a viewpoint that is at a given distance from a surface of the virtual object. Referring back to the illustration in FIG. 3C, for example, the virtual object may be similar to the virtual object 300 and the viewpoint may initially correspond to one of the viewpoints 326, 328, 356, 366 or 368.

At block 504, the method 500 includes causing a change of the view along a rotational path around the virtual object in response to the receipt of the instructions based on the given distance being greater than a threshold distance. Referring back to the illustration in FIG. 3C, the threshold distance may be greater than a first distance between the viewpoint 356 and the virtual object 300, and the threshold distance may be less than a second distance between the viewpoint 366 and the virtual object 300. Thus, for example, when the view initially corresponds to the viewpoint 366, the device may change the view along the path 364 (e.g., the rotational path) to the viewpoint 368 based on the given distance (e.g., the second distance) being greater than the threshold distance in response to the receipt of the instructions. For example, a processor in the device may send instructions to a graphics processing unit (GPU) to cause the GPU to change the view (e.g., by displaying the changed view).

At block 506, the method 500 includes causing a change of the view along a translational path indicative of a shape of the surface of the virtual object in response to the receipt of the instructions based on the given distance being less than the threshold distance. Referring back to the illustration in FIG. 3C, for example, when the view initially corresponds to the viewpoint 326, the device may change the view along the path 324 (e.g., the translational path) to the viewpoint 328 based on the given distance (e.g., distance between the viewpoint 326 and the virtual object 300) being less than the threshold distance. For example, a processor in the device may send instructions to a graphics processing unit (GPU) to cause the GPU to change the view (e.g., by displaying the changed view).

At block 508, the method 500 includes determining an isosurface configured to encompass the virtual object based on one or more geometric primitives. The isosurface may include a plurality of points that are at the given distance from the surface of the virtual object. The viewpoint may be configured to be at a given point of the plurality of points such that a line-of-sight of the view is substantially perpendicular to a gradient of the isosurface when the view is changed.

Referring back to the illustration in FIG. 4, the isosurface may correspond to one of the isosurfaces 420-460, for example. In some examples, the one or more geometric primitives may include 2D shapes such as points, lines, line segments, planes, circles, ellipses, triangles, polygons, spline curves, etc. Additionally, in some examples, the one or more geometric primitives may include 3D geometric shapes such as spheres, cubes, toroids, cylinders, pyramids, etc.

In one example, the isosurface may be determined to include a sphere configured to encompass a portion of the virtual object 400 that includes the surface 404 and a cube configured to encompass a portion of the virtual object 400 that includes the surfaces 402 and 406. In another example, the one or more geometric primitives may be selected to correspond to one or more surfaces of the virtual object 400, and a computer graphics process such as ray casting may be employed to determine the isosurface. For example, a plane may be selected to correspond to the surface 402 and a point may be selected to correspond to the surface 404. Further, in this example, the plane and the point may be configured as emitters to perform the ray casting such that the isosurface includes level-sets of a scalar minimum distance field (e.g., the plurality of points) from the plane emitter and the point emitter at the given distance.

In the examples described above, the level-sets may include the plurality of points on the isosurface that are at the given distance from the surface of the virtual object. For example, referring to the example at block 504, the viewpoint 368 may be selected to correspond to the given point of the plurality of points. Thus, changing the view as described at block 504, may include changing the view from the viewpoint 366 to the given point corresponding to the viewpoint 368 along the isosurface that includes the path 364. Additionally, in some examples, the line-of-sight of the view at the viewpoint 368 (e.g., dashed lines in FIG. 3C) may be configured to be substantially perpendicular to the gradient of the isosurface at the given point when the view is changed. Thus, for example, the view of the virtual object after the change may be along an intuitive line-of-sight focused on the object when the view is changed.

In some examples, the method 500 may further include receiving input indicative of a position in a 2D space by the device. Additionally, in these examples, the method 500 may further include determining the instructions to correspond to moving the viewpoint from an initial point of the plurality of points to the given point based on a map between the 2D space and the isosurface. For example, the input may comprise (x, y) coordinates of a touch on a touch screen, and the device may map the (x, y) coordinates to the given point of the plurality of points to determine the instructions for changing the view. Thus, referring to the example at block 506, the device may change the view from the viewpoint 326 (e.g., initial point) to the viewpoint 328 (e.g., the mapped given point) along the isosurface (e.g., the path 324), for example.

In some examples, the method 500 may further include receiving input indicative of a second distance (e.g., different zoom setting) between the surface of the virtual object and the viewpoint by the device. In these examples, the method 500 may further include changing the view along a given path that is substantially perpendicular to the gradient of the isosurface at the given point such that the viewpoint is at the second distance from the surface of the virtual object. Referring back to FIG. 3C, the virtual object may be initially viewable from the viewpoint 356, for example. Further, for example, the device may receive the input (e.g., from a scrollbar of a mouse) and may map the received input to the second distance. Thus, in this example, the device may change the view of the virtual object along the given path that is substantially perpendicular to the gradient of the isosurface (e.g., dashed lines in FIG. 3C) to the viewpoint 366.

In some examples, the method 500 may further include determining a plurality of isosurfaces based on the one or more geometric primitives. The plurality of isosurfaces may be associated with a plurality of distances from the surface of the virtual object. Further, in these examples, the method 500 may also include selecting the isosurface from within the plurality of isosurfaces based on matching the given distance with one of the plurality of distances. For example, the device may determine the plurality of isosurfaces similar to the isosurfaces 420-460 illustrated in FIG. 4 as a pre-processing step when the virtual object is selected for viewing. Thus, for example, the device may determine an initial view of the virtual object based on the given distance to be along one of the plurality of isosurfaces that has a first distance that is most proximal to the given distance. Additionally, for example, the device may be configured to change the view along the selected isosurface as described earlier. Additionally, for example, the plurality of isosurfaces may correspond to zoom levels of the device. For example, when the device receives input indicative of the second distance from the surface of the virtual object, the device may map the received input to one of the determined plurality of isosurfaces. Thus, for example, the plurality of isosurfaces may represent a maximum zoom level (e.g., isosurface 420 in FIG. 4), a minimum zoom level (e.g., isosurface 460), and intermediate zoom levels (e.g., isosurfaces 430-450).

In some examples, the method 500 may also include determining the plurality of points such that a difference between the gradient at the given point and the gradient at an adjacent point of the plurality of points is less than a threshold value. As mentioned earlier, in some examples, the plurality of points may correspond to level-sets of the minimum distance field from the surface of the virtual object. Thus, for example, the plurality of points may be determined based on sampling the level-sets of the minimum distance field to determine the isosurface. In some examples, a sampling rate when determining the plurality of points may correspond to a shape of the isosurface. For example, a low sampling rate may reduce smoothness of the gradient of the isosurface. Thus, in some examples, the plurality of points (e.g., based on sampling rate) may be determined such that the difference between the gradient in adjacent points of the plurality of points is less than the threshold value (e.g., to control smoothness of the gradient).

Figure 6:
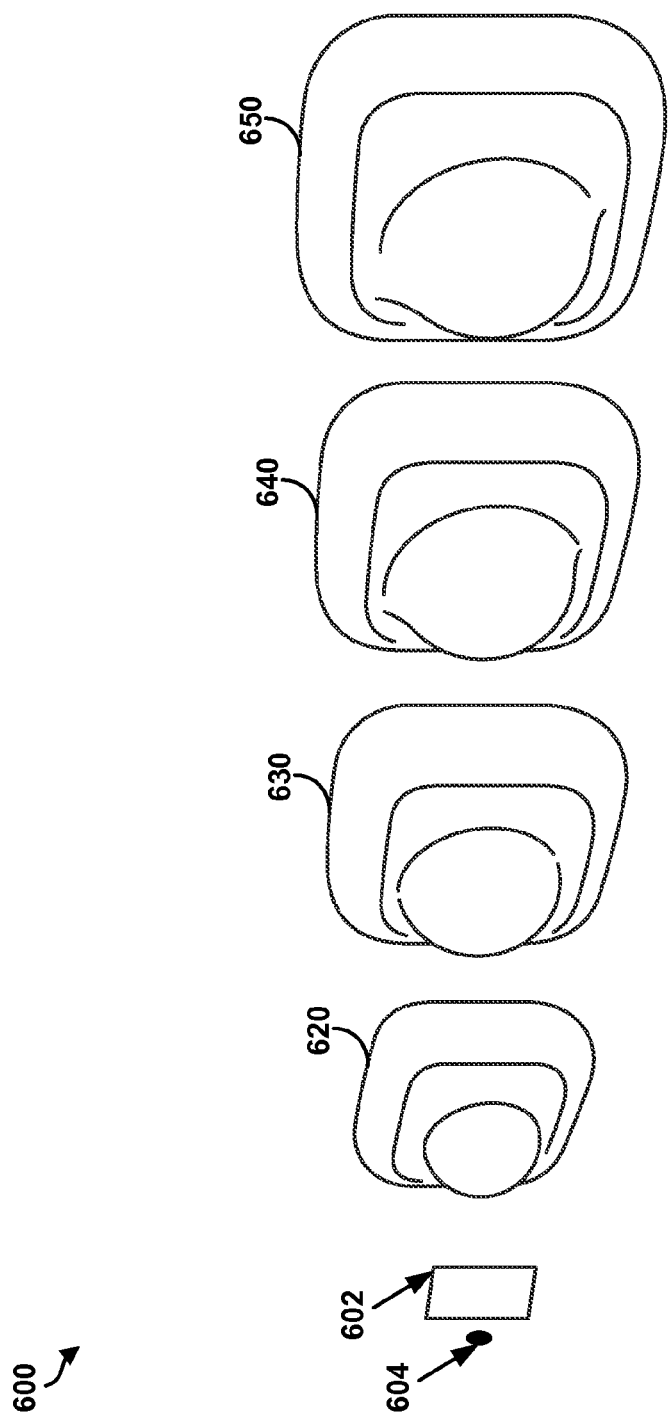
FIG. 6 illustrates an example system for determining a plurality of isosurfaces based on one or more geometric primitives, in accordance with at least some embodiments described herein.

FIG. 6 illustrates an example system 600 for determining a plurality of isosurfaces 620-650 based on one or more geometric primitives 602-604, in accordance with at least some embodiments described herein. The system 600 illustrates an example implementation for determining the isosurfaces 420-460 in FIG. 4 and the isosurface in the description of method 500, for example.

The system 600 includes the one or more geometric primitives 602-604 comprising a plane 602 and a point 604. In some examples, the geometric primitives 602 and 604 may represent proxy geometry for a virtual object. For example, the point 602 may correspond to a point on the surface 404 of FIG. 4, and the plane 604 may correspond to the surface 402 of FIG. 4. The arrangement of the geometric primitives 602-604 may correspond, respectively, to the arrangement of the surface 402 and the surface 404. Thus, for example, the geometric primitives 602-604 may correspond to a coarse representation of the virtual object 400 in FIG. 4. In some examples, the system 600 may include additional geometric primitives such as a second plane that corresponds to a surface opposite the surface 402 in FIG. 4.

In some examples, the system 600 may employ an algorithm such as ray casting to determine the plurality of isosurfaces 620-650. For example, the geometric primitives 602-604 may be configured as emitters of a scalar minimum distance field, and the isosurfaces 620-650 may correspond to intersections of rays from the emitters. For example, the isosurface 620 may comprise level-sets (e.g., plurality of points) that are at a first distance from the geometric primitives 602-604. Similarly, for example, the isosurfaces 630-650 may comprise level-sets that are at various distances from the geometric primitives 602-604. For example, where the geometric primitives 602-604 correspond to surfaces 402-404 in FIG. 4, the isosurfaces 620-650 may represent, respectively, the isosurfaces 420-450 in FIG. 4. For example, referring to FIG. 3C, the isosurface 620 may include two points that correspond to the viewpoints 326 and 328. Similarly, the isosurface 650 may include a point that corresponds to the viewpoint 356 in FIG. 3C.

Additionally, in some examples, the isosurfaces 620-650 determined based on the minimum scalar distance field may be generally robust to mesh surface cracks, holes, self-intersections, and other complex mesh topology in the virtual object represented by the geometric primitives 602-604. Additionally, in some examples, the isosurfaces 620-650 may allow for smooth interpolatable paths along the sampled differentiated gradient of the scalar minimum distance field such as the paths 320, 330, 340, 350, and 360 in FIG. 3B.

Additionally, for example, shapes of the isosurfaces 620-650 may be based on distance from the geometric primitives 602-604. For example, as illustrated in FIG. 6, a shape of the isosurface 620 substantially corresponds to the shape of the surface of the virtual object 400 represented by the geometric primitives 602-604 based on the given distance between the isosurface 620 and the geometric primitives 602-604 being less than the threshold distance. Thus, for example, the isosurface 620 may include the translational path described in methods 200 and 500. In another example, a shape of the isosurface 650 corresponds to a blend between a spherical shape (e.g., rotational path) and the shape of the surface of the virtual object 400 represented by the geometric primitives 602-604 based on the given distance between the isosurface 650 and the geometric primitives 602-604 being less than the threshold distance but closer to the threshold distance than isosurface 620. Thus, for example, the isosurface 650 may include the translational path indicative of the blend between the shape of the surface of the virtual object and the rotational path as described in method 200.

Although not illustrated in FIG. 6, in some examples where the distance between a given isosurface determined by the system 600 and the virtual object 400 is greater than the threshold distance, a shape of the given isosurface may resemble a sphere that includes the rotational path described in methods 200 and 500.

Figure 7:
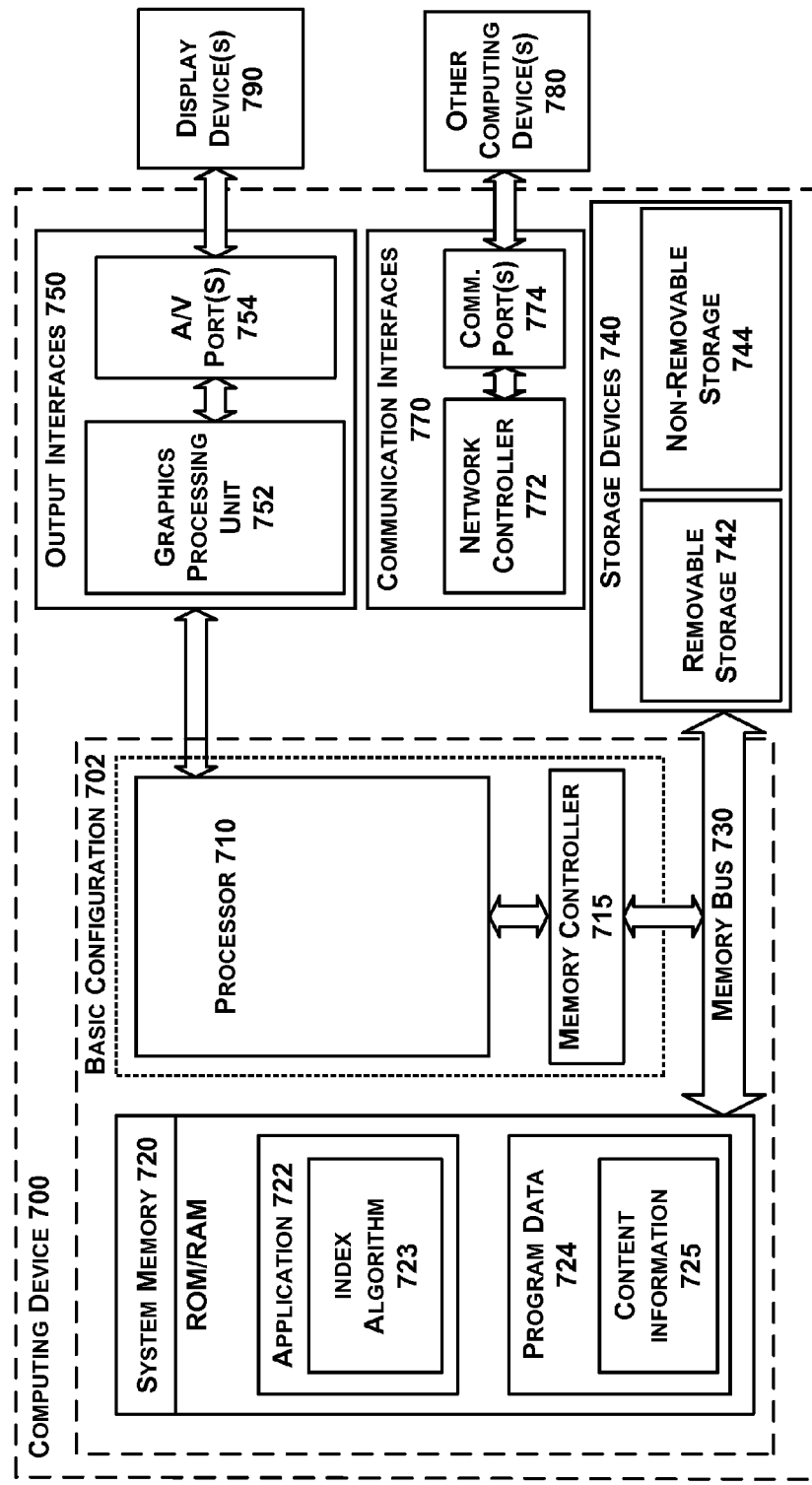
FIG. 7 is a block diagram illustrating an example computing device used in a computing system that is arranged in accordance with at least some embodiments described herein.

FIG. 7 is a block diagram illustrating an example computing device used in a computing system that is arranged in accordance with at least some embodiments described herein. The computing device may comprise a personal computer, mobile device, cellular phone, touch-sensitive wristwatch, tablet computer, video game system, or global positioning system, and may be implemented to provide a system for viewing three-dimensional (3D) data object models as described in FIGS. 1-6. In a basic configuration 702, computing device 700 may typically include one or more processors 710 and system memory 720. A memory bus 730 may be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include one or more applications 722, and program data 724. Application 722 may include an index algorithm 723 that is arranged to provide inputs to the electronic circuits, in accordance with the present disclosure. Program data 724 may include content information 725 that could be directed to any number of types of data. In some example embodiments, application 722 may be arranged to operate with program data 724 on an operating system.

Computing device 700 can have additional features or functionality, and additional interfaces to facilitate communications between the basic configuration 702 and any devices and interfaces. For example, data storage devices 740 may be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 may also include output interfaces 750 that may include a graphics processing unit 752, which may be configured to communicate to various external devices such as display devices 790 or speakers via one or more A/V ports 754 or a communication interface 770. The communication interface 770 may include a network controller 772, which can be arranged to facilitate communications with one or more other computing devices 780 over a network communication via one or more communication ports 774. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

Figure 8:
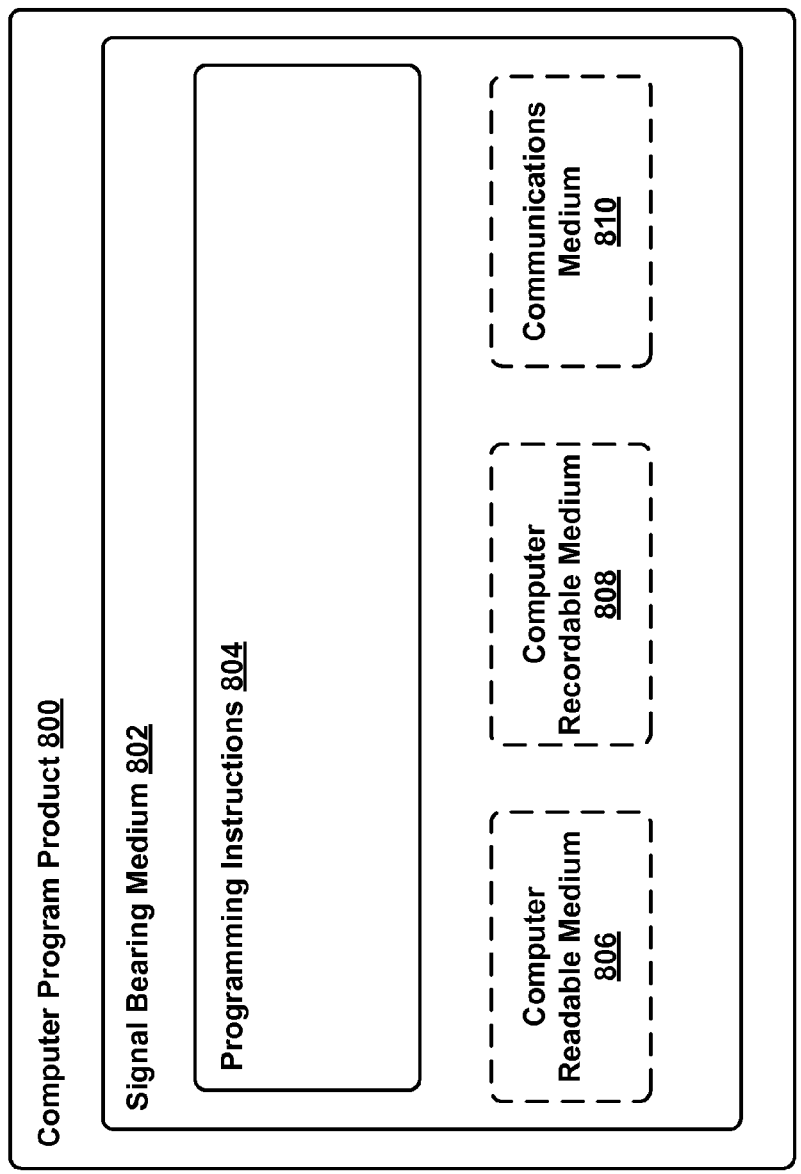
FIG. 8 depicts an example computer readable medium configured according to at least some embodiments described herein.

FIG. 8 depicts an example computer-readable medium configured according to at least some embodiments described herein. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. methods 200 and 500) may be implemented by computer program instructions encoded on a computer readable storage media in a machine-readable format, or on other media or articles of manufacture (e.g., the instructions stored on system memory 720 of the computing device 700). FIG. 8 is a schematic illustrating a conceptual partial view of an example computer program product that includes a computer program for executing a computer process on a computing device, arranged according to at least some embodiments disclosed herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 may be a computer-readable medium 806, such as, but not limited to, a hard disk drive, a Compact Disc (CD), a Digital Video Disk (DVD), a digital tape, memory, etc. In some implementations, the signal bearing medium 802 may be a computer recordable medium 808, such as, but not limited to, memory, read/write (R/W) CDs, R/W DVDs, etc. In some implementations, the signal bearing medium 802 may be a communication medium 810 (e.g., a fiber optic cable, a waveguide, a wired communications link, etc.). Thus, for example, the signal bearing medium 802 may be conveyed by a wireless form of the communications medium 810.

The one or more programming instructions 804 may be, for example, computer executable and/or logic implemented instructions. In some examples, a computing device may be configured to provide various operations, functions, or actions in response to the programming instructions 804 conveyed to the computing device by one or more of the computer readable medium 806, the computer recordable medium 808, and/or the communications medium 810.

The computer readable medium 806 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:
1. A method comprising:
receiving, by a device configured to operate a display, instructions indicative of changing a view of a virtual object displayed on the display, wherein at least a portion of the virtual object is viewable on the display according to a viewpoint that is at a given distance from a surface of the virtual object;
based on the given distance being greater than a threshold distance, operating the display to cause a change of the view along a rotational path around the virtual object in response to the receipt of the instructions, wherein the rotational path is associated with a shape of a spherical surface; and
based on the given distance being less than the threshold distance, operating the display to cause a change of the view along a translational path indicative of a blend of a shape of the surface of the virtual object and the shape of the spherical surface associated with the rotational path in response to the receipt of the instructions, wherein a degree of similarity between the translational path and the rotational path is based on the given distance from the surface of the virtual object.
2. The method of claim 1, further comprising:
determining, based on one or more features in the virtual object, a relative direction of the virtual object that corresponds to a location of the one or more features, wherein changing the view is further based on an alignment between the view and the relative direction of the virtual object.

3. The method of claim 1, further comprising:
determining, based on one or more geometric primitives, an isosurface configured to encompass the virtual object, wherein the isosurface includes a plurality of points that are at the given distance from the surface of the virtual object, wherein the viewpoint is configured to be at a given point of the plurality of points such that a line-of-sight of the view is substantially perpendicular to a gradient of the isosurface at the given point when the view is changed.

4. The method of claim 3, further comprising:
receiving, by the device, input indicative of a position in a 2D space; and
determining, based on a map between the 2D space and the isosurface, the instructions to correspond to moving the viewpoint from an initial point of the plurality of points to the given point.

5. The method of claim 3, wherein the given distance is a first distance, the method further comprising:
receiving, by the device, input indicative of a second distance between the surface of the virtual object and the viewpoint; and
responsive to receiving the input, causing a change of the view along a given path that is substantially perpendicular to the gradient of the isosurface at the given point such that the viewpoint is at the second distance from the surface of the virtual object.

6. The method of claim 3, further comprising:
determining, based on the one or more geometric primitives, a plurality of isosurfaces configured to encompass the virtual object, wherein the plurality of isosurfaces are associated with a plurality of distances from the surface of the virtual object; and
selecting, from within the plurality of isosurfaces, the isosurface based on matching the given distance with one of the plurality of distances.

7. The method of claim 3, further comprising:
determining, by the device, the plurality of points such that a difference between the gradient at the given point and the gradient at an adjacent point of the plurality of points is less than a threshold value.

8. The method of claim 3, wherein the one or more geometric primitives include spheres, cubes, toroids, cylinders, pyramids, points, line segments, planes, circles, ellipses, spline curves, triangles, or polygons.

9. A device comprising:
a display;
one or more processors; and
data storage configured to store instructions executable by the one or more processors to cause the device to:
receive data indicative of changing a view of a virtual object displayed on the display, wherein at least a portion of the virtual object is viewable on the display according to a viewpoint that is at a given distance from a surface of the virtual object;
based on the given distance being greater than a threshold distance, operate the display to cause a change of the view along a rotational path around the virtual object in response to the receipt of the data, wherein the rotational path is associated with a shape of a spherical surface; and
based on the given distance being less than the threshold distance, operate the display to cause a change of the view along a translational path indicative of a blend of a shape of the surface of the virtual object and the shape of the spherical surface associated with the rotational path in response to the receipt of the data, wherein a degree of similarity between the translational path and the rotational path is based on the given distance from the surface of the virtual object.

10. The device of claim 9, wherein the instructions executable by the one or more processors further cause the device to:
determine, based on one or more features in the virtual object, a relative direction of the virtual object that corresponds to a location of the one or more features, wherein changing the view is further based on an alignment between the view and the relative direction of the virtual object.

11. The device of claim 9, wherein the instructions executable by the one or more processors further cause the device to:
determine, based on one or more geometric primitives, an isosurface configured to encompass the virtual object, wherein the isosurface includes a plurality of points that are at the given distance from the surface of the virtual object, wherein the viewpoint is configured to be at a given point of the plurality of points such that a line-of-sight of the view is substantially perpendicular to a gradient of the isosurface at the given point when the view is changed.

12. The device of claim 11, wherein the instructions executable by the one or more processors further cause the device to:
receive input indicative of a position in a 2D space; and
determine, based on a map between the 2D space and the isosurface, the data to correspond to moving the viewpoint from an initial point of the plurality of points to the given point.

13. The device of claim 11, wherein the given distance is a first distance, wherein the instructions executable by the one or more processors further cause the device to:
receive input indicative of a second distance between the surface of the virtual object and the viewpoint; and
responsive to receiving the input, cause a change of the view along a given path that is substantially perpendicular to the gradient of the isosurface at the given point such that the viewpoint is at the second distance from the surface of the virtual object.

14. A non-transitory computer readable medium having stored therein instructions, that when executed by a computing device, cause the computing device to perform functions, the functions comprising:
receiving, by the computing device configured to operate a display, data indicative of changing a view of a virtual object displayed on the display, wherein at least a portion of the virtual object is viewable from a viewpoint that is at a given distance from a surface of the virtual object;
based on the given distance being greater than a threshold distance, operating the display to cause a change of the view along a rotational path around the virtual object in response to the receipt of the data, wherein the rotational path is associated with a shape of a spherical surface; and
based on the given distance being less than the threshold distance, operating the display to cause a change of the view along a translational path indicative of a blend of a shape of the surface of the virtual object and the shape of the spherical surface associated with the rotational path in response to the receipt of the data, wherein a degree of similarity between the translational path and the shape of the rotational path is based on the given distance from the surface of the virtual object.

15. The non-transitory computer readable medium of claim 14, the functions further comprising:
   determining, based on one or more features in the virtual object, a relative direction of the virtual object that corresponds to a location of the one or more features, wherein changing the view is further based on an alignment between the view and the relative direction of the virtual object.

16. The non-transitory computer readable medium of claim 14, the functions further comprising:
   determining, based on one or more geometric primitives, an isosurface configured to encompass the virtual object, wherein the isosurface includes a plurality of points that are at the given distance from the surface of the virtual object, wherein the viewpoint is configured to be at a given point of the plurality of points such that a line-of-sight of the view is substantially perpendicular to a gradient of the isosurface at the given point when the view is changed.

17. The non-transitory computer readable medium of claim 16, the functions further comprising:
   receiving, by the computing device, input indicative of a position in a 2D space; and
   determining, based on a map between the 2D space and the isosurface, the data to correspond to moving the viewpoint from an initial point of the plurality of points to the given point.

* * * * *